United States Patent
Chen (10) Patent No.: US 8,735,799 B2
(45) Date of Patent: May 27, 2014

(54) OPTICAL TOUCH PANEL AND OPTICAL TOUCH DEVICE

(75) Inventor: Chung-Yuan Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 215 days.

(21) Appl. No.: 13/367,104

(22) Filed: Feb. 6, 2012

(65) Prior Publication Data

US 2013/0105673 A1    May 2, 2013

(30) Foreign Application Priority Data

Oct. 28, 2011    (TW) .............................. 100139311 A (51) Int. Cl.
*G06M 7/00*    (2006.01)
(52) U.S. Cl.
USPC ........................................................ 250/221
(58) Field of Classification Search
USPC .................. 250/221, 227.11, 227.14, 227.16, 250/227.23; 345/173–176
See application file for complete search history.

(56) References Cited

U.S. PATENT DOCUMENTS

| | | | |
|---|---|---|---|
| 6,859,572 B2* | 2/2005 | Ishibashi | 385/16 |
| 2006/0016994 A1* | 1/2006 | Basoor et al. | 250/338.1 |
| 2009/0322699 A1* | 12/2009 | Hansson | 345/174 |
| 2010/0103140 A1* | 4/2010 | Hansson | 345/175 |
| 2011/0128257 A1* | 6/2011 | Kim | 345/175 |

* cited by examiner

*Primary Examiner* — Thanh Luu
*Assistant Examiner* — Renee Naphas
(74) *Attorney, Agent, or Firm* — Kirton McConkie; Evan R. Witt (57) ABSTRACT

The present invention discloses an optical touch panel including a support plate, a light emitting element, an optical fiber, an optical sensing element and a control unit. The optical fiber is arranged on the support plate in a bending manner. A light beam generated by the light emitting element is transmitted through the optical fiber and received by the optical sensing element. When the optical fiber is touched by an object, an optical return is generated within the optical fiber and received by the optical sensing element. As a result, the control unit obtains a contact location where the object located according to the receiving time of the light beam, the receiving time of the optical return and the conduction velocity of the light beam.

16 Claims, 6 Drawing Sheets

OPTICAL TOUCH PANEL AND OPTICAL TOUCH DEVICE

FIELD OF THE INVENTION

The present invention generally relates to a touch panel and a touch device, and more particularly to an optical touch panel and an optical touch device.

BACKGROUND OF THE INVENTION

In general, a touch device comprises a light emitting module and a touch panel, wherein the light emitting module is composed of a plurality of light emitting elements and at least a light guide plate, and the touch panel can be divided into capacitive touch panels, resistive touch panels and optical touch panels. Compared with the capacitive touch panels and the resistive touch panels, the cost of the optical touch panels are lower and thus have an advantage of higher economic benefit.

Figure 1:
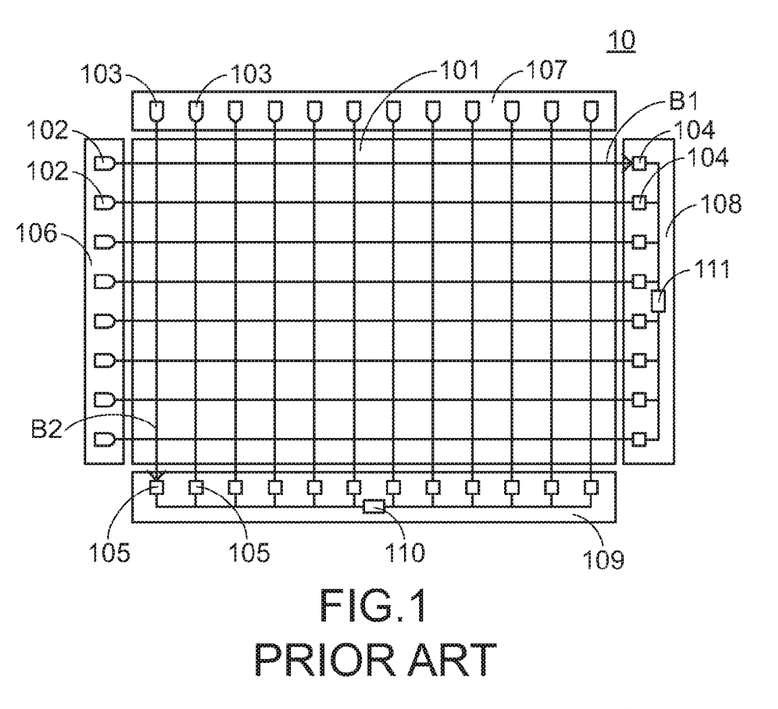
FIG. 1 illustrates a structural top view of a conventional optical touch panel.

FIG. 1 illustrates a structural top view of a conventional optical touch panel. Referring to FIG. 1, the conventional optical touch panel 10 comprises a contact plate 101, a plurality of first light emitting elements 102, a plurality of second light emitting elements 103, a plurality of first optical sensing elements 104, a plurality of second optical sensing elements 105, a first circuit board 106, a second circuit board 107, a third circuit board 108 and a fourth circuit board 109, a first control unit 110 and a second control unit 111. The contact plate 101 is capable of being contacted by at least a finger of a user or by a stylus. The plurality of first light emitting elements 102 are capable of generating a plurality of first light beams B1, wherein the plurality of first light beams B1 travel along a horizontal direction and are transmitted over the contact plate 101. The plurality of second light emitting elements 103 are capable of generating a plurality of second light beams B2, wherein the plurality of second light beams B2 travel along a vertical direction and are transmitted over the contact plate 101. Herein, each of the plurality of first light emitting elements 102 and the plurality of second light emitting elements 103 is an infrared light emitting source, and each of the first light beams B1 and the second light beams B2 is an infrared light and invisible by the user.

As illustrated in FIG. 1, the first circuit board 106 is disposed at a left side of the contact plate 101 and capable of disposing the plurality of first light emitting elements 102 thereon. In addition, the third circuit board 108 is disposed at a right side of the contact plate 101 and capable of disposing the plurality of first optical sensing elements 104 and the first control unit 110 thereon. Herein, each of the first light emitting elements 102 corresponds to one of the first optical sensing elements 104, and the first control unit 110 connects with each of the plurality of first optical sensing elements 104. Besides, the second circuit board 107 is disposed at an upper side of the contact plate 101 and capable of disposing the plurality of second light emitting elements 103 thereon. Moreover, the fourth circuit board 109 is disposed at a lower side of the contact plate 101 and capable of disposing the plurality of second optical sensing elements 105 and the second control unit 111 thereon. Herein, each of the second light emitting elements 103 corresponds to one of the second optical sensing elements 105, and the second control unit 111 connects with each of the plurality of second optical sensing elements 105.

The plurality of first optical sensing elements 104 are capable of receiving the plurality of first light beams B1 from the plurality of first light emitting elements 102 and then converting the received first light beams B1 from a form of light energy into electrical signals in a form of electrical energy, so as to output the corresponding electrical signals to the first control unit 110. Similarly, the plurality of second optical sensing elements 105 are capable of receiving the plurality of second light beams B2 from the plurality of second light emitting elements 103 and then converting the received second light beams B2 from a form of light energy into electrical signals in a form of electrical energy, so as to output the corresponding electrical signals to the second control unit 111.

When the conventional optical touch panel 10 is activated and the contact plate 101 is untouched, the plurality of first light emitting elements 102 generate a plurality of first light beams B1, and the plurality of first light beams B1 are transmitted over the contact plate 101 and thus respectively received by the corresponding one of the plurality of first optical sensing elements 104, so that the plurality of first optical sensing elements 104 output the electrical signals corresponding to the first light beams B1 to the first control unit 110. On the other hand, the plurality of second light emitting elements 103 generate a plurality of second light beams B2, and the plurality of second light beams B2 are transmitted over the contact plate 101 and thus respectively received by the corresponding one of the plurality of second optical sensing elements 105, so that the plurality of second optical sensing elements 105 output the electrical signals corresponding to the second light beams B2 to the second control unit 111.

Figure 2:
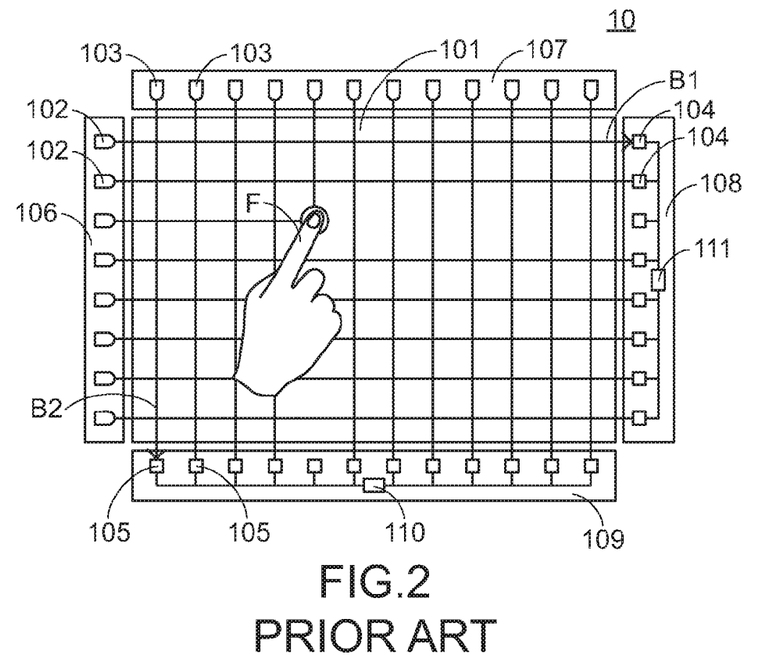
FIG. 2 illustrates a structural top view of a conventional optical touch panel being touched.

FIG. 2 illustrates a structural top view of a conventional optical touch panel being touched.

Referring to FIG. 2, when the conventional optical touch panel 10 is activated and a specific point of the contact plate 101 is touched by the finger F of the user, the first light beam B1 generated by the third one of the plurality of first light emitting elements 102 is interrupted by the finger F of the user. Therefore, the interrupted first light beam B1 is unable to be received by the corresponding one of the plurality of first optical sensing elements 104, and the remaining first light beams B1 other than the interrupted first light beam B1 generated by the third one of the plurality of first light emitting elements 102 are respectively received by the corresponding one of the plurality of first optical sensing elements 104, and thus only those of the first optical sensing elements 104 receiving the first light beams B1 output the corresponding electrical signals to the first control unit 110. Hence, according to the first optical sensing element 104 without outputting an electrical signal, the first control unit 110 is capable of determining which horizontal position existed with an object due to a travel of the first light beam B1 is interrupted.

Similarly, the second light beam B2 generated by the fifth one of the plurality of second light emitting elements 103 is interrupted by the finger F of the user. Therefore, the interrupted second light beam B2 is unable to be received by the corresponding one of the plurality of second optical sensing elements 105, and the remaining second light beams B2 other than the interrupted second light beam B2 generated by the fifth one of the plurality of second light emitting elements 105 are respectively received by the corresponding one of the plurality of second optical sensing elements 105, and thus only those of the second optical sensing elements 105 receiving the second light beams B2 output the corresponding electrical signals to the second control unit 111. Hence, according to the second optical sensing element 105 without outputting an electrical signal, the second control unit 111 is capable of determining which vertical position existed with the object due to a travel of the second light beam B2 is interrupted. As a result of the principle mentioned above, the first control unit 110 and the second control unit 111 can determine a location of the finger F of the user and output a trigger signal corresponding to the location of the finger F. The operation of the conventional optical touch panel 10 is as disclosed above.

However, the conventional optical touch panel 10 have to dispose with a significant amount of the first light emitting elements 102, the second light emitting elements 103, the first optical sensing elements 104 corresponding to the first light emitting elements 102 and the second optical sensing elements 105 corresponding to the second light emitting elements 103 for sensing the location of the finger F of the user. Hence, the conventional optical touch panel 10 is necessarily requires a higher cost. Similarly, the conventional optical touch device with the conventional optical touch panel has the same disadvantages. Accordingly, it is desired to provide an optical touch panel and an optical touch device capable of being manufactured with lower cost.

SUMMARY OF THE INVENTION

The present invention is directed to an optical touch panel capable of being manufactured with lower cost.

The present invention is further directed to an optical touch device capable of being manufactured with lower cost.

In a preferred embodiment, the present invention provides an optical touch panel, comprising:
  a support plate;
  a light emitting element, capable of generating a light beam;
  an optical fiber, arranged on the support plate in a bending manner, wherein a first end of the optical fiber is capable of receiving the light beam, and thus the light beam is transmitted through the optical fiber and then outputted from a second end of the optical fiber, when the optical fiber is touched by an object, an optical return is generated within the optical fiber;
  an optical sensing element, disposed adjacent to the second end of the optical fiber, capable of receiving the light beam transmitted through the optical fiber and then outputting a first signal corresponding to the light beam, and capable of receiving the optical return and then outputting a second signal corresponding to the optical return; and
  a control unit, connecting with the optical sensing element, and capable of determining a contact location where the optical fiber is touched by the object according to the first signal and the second signal and then outputting a trigger signal corresponding to the object.

In a preferred embodiment, the optical fiber comprises a plurality of straight line segments and a plurality of turning segments, each of the turning segments is located between adjacent two of the straight line segments, and the plurality of straight line segments are parallel to one another.

In a preferred embodiment, the support plate has a trench disposed to an upper surface of the support plate and capable of disposing the optical fiber therein, and an appearance of the trench is formed as a serpentine shape corresponding to the optical fiber being bended.

In a preferred embodiment, the optical touch panel of the present invention further comprises:
  a first circuit board, capable of disposing the light emitting element thereon and providing electric power to the light emitting element; and
  a second circuit board, capable of disposing the optical sensing element thereon and providing electric power to the optical sensing element.

In a preferred embodiment, the control unit obtains a trigger distance d according to a first time t1 that the first signal is received, a second time t2 that the second signal is received and a conduction velocity Vf of the light beam transmitted by the optical fiber, and then obtains the contact location according to the trigger distance and a total length of the optical fiber, and $d=(Vf \times (t2-t1))/2$.

In a preferred embodiment, the control unit is preset to have a location database capable of storing a plurality of support plate coordinates, and when the control unit obtains the trigger distance, the control unit searches one of the support plate coordinates corresponding to the trigger distance from the location database, so as to obtain the contact location.

In a preferred embodiment, when a plurality of contact locations of the optical fiber are touched by the object, the control unit obtains a plurality of support plate coordinates corresponding to a plurality of trigger distances according to the plurality of trigger distances corresponding to the plurality of contact locations, and the control unit averages the plurality of support plate coordinates to obtain a center contact location of the plurality of contact locations and outputs the trigger signal corresponding to the center contact location.

In a preferred embodiment, the optical return travels from the contact location where the optical fiber is touched by the object to the first end of the optical fiber, and the optical return is reflected by the first end of the optical fiber, travels from the first end of the optical fiber to the second end of the optical fiber, and received by the optical sensing element in sequence.

In a preferred embodiment, the optical fiber comprises:
  an optical fiber core, capable of transmitting the light beam and the optical return; and
  an optical fiber cladding, covering the optical fiber core and capable of enabling the light beam and the optical return to be totally reflected in the optical fiber core.

In a preferred embodiment, the present invention further provides an optical touch device, comprising:
  an optical touch panel, comprising:
    a support plate;
    a light emitting element, capable of generating a first light beam;
    an optical fiber, arranged on the support plate in a bending manner, wherein a first end of the optical fiber is capable of receiving the first light beam, and thus the first light beam is transmitted through the optical fiber and then outputted from a second end of the optical fiber, when the optical fiber is touched by an object, an optical return is generated within the optical fiber;
    an optical sensing element, disposed adjacent to the second end of the optical fiber, capable of receiving the first light beam transmitted through the optical fiber and then outputting a first signal corresponding to the first light beam, and capable of receiving the optical return and then outputting a second signal corresponding to the optical return; and
    a control unit, connecting with the optical sensing element, and capable of determining a contact location where the optical fiber is touched by the object according to the first signal and the second signal and then outputting a trigger signal corresponding to the object;
  another light emitting element, located at a first side of the light emitting element and capable of generating a second light beam; and
  a light guide plate, disposed under the support plate and capable of guiding the second light beam to let the optical touch device be luminous.

In a preferred embodiment, the optical fiber comprises a plurality of straight line segments and a plurality of turning segments, each of the turning segments is located between adjacent two of the straight line segments, and the plurality of straight line segments are parallel to one another.

In a preferred embodiment, the support plate has a trench disposed to an upper surface of the support plate and capable of disposing the optical fiber therein, and an appearance of the trench is formed as a serpentine shape corresponding to the optical fiber being bended.

In a preferred embodiment, the optical touch device of the present invention further comprises:
- a first circuit board, capable of disposing the light emitting element and the another light emitting element thereon and providing electric power to the light emitting element and the another light emitting element; and
- a second circuit board, capable of disposing the optical sensing element thereon and providing electric power to the optical sensing element.

In a preferred embodiment, the control unit obtains a trigger distance d according to a first time t1 that the first signal is received, a second time t2 that the second signal is received and a conduction velocity Vf of the light beam transmitted by the optical fiber, and then obtains the contact location according to the trigger distance and a total length of the optical fiber, and $d=(Vf\times(t2-t1))/2$.

In a preferred embodiment, the control unit is preset to have a location database capable of storing a plurality of support plate coordinates, and when the control unit obtains the trigger distance, the control unit searches one of the support plate coordinates corresponding to the trigger distance from the location database, so as to obtain the contact location.

In a preferred embodiment, when a plurality of contact locations of the optical fiber are touched by the object, the control unit obtains a plurality of support plate coordinates corresponding to a plurality of trigger distances according to the plurality of trigger distances corresponding to the plurality of contact locations, and the control unit averages the plurality of support plate coordinates to obtain a center contact location of the plurality of contact locations and outputs the trigger signal corresponding to the center contact location.

In a preferred embodiment, the optical return travels from the contact location where the optical fiber is touched by the object to the first end of the optical fiber, and the optical return is reflected by the first end of the optical fiber, travels from the first end of the optical fiber to the second end of the optical fiber, and received by the optical sensing element in sequence.

In a preferred embodiment, the optical fiber comprises:
- an optical fiber core, capable of transmitting the first light beam and the optical return; and
- an optical fiber cladding, covering the optical fiber core and capable of enabling the first light beam and the optical return to be totally reflected in the optical fiber core.

DETAILED DESCRIPTION OF THE PREFERRED EMBODIMENT

Figure 3:
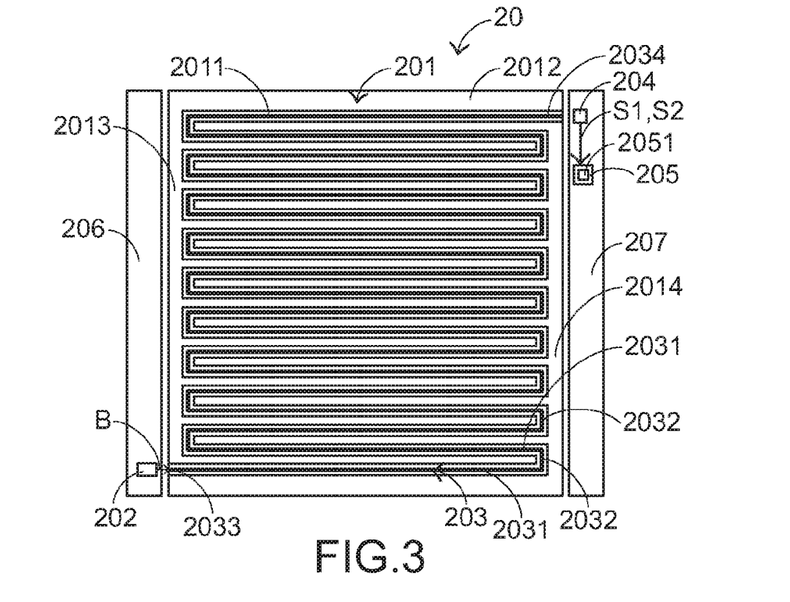
FIG. 3 illustrates a structural top view of an optical touch panel according to a first preferred embodiment of the present invention.
Figure 4:
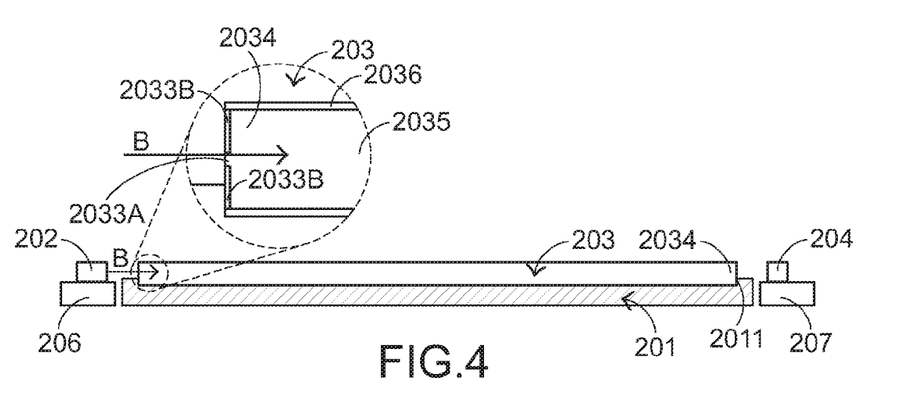
FIG. 4 illustrates a structural side view of the optical touch panel according to the first preferred embodiment of the present invention.

In view of the defects of the conventional arts, the present invention provides an optical touch panel and an optical touch device capable of being manufactured with lower cost. FIG. 3 illustrates a structural top view of an optical touch panel according to a first preferred embodiment of the present invention, and FIG. 4 illustrates a structural side view of the optical touch panel according to the first preferred embodiment of the present invention. Referring to FIG. 3 and FIG. 4 together, the optical touch panel 20 comprises a support plate 201, a light emitting element 202, an optical fiber 203, an optical sensing element 204, a control unit 205, a first circuit board 206 and a second circuit board 207. The support plate 201 has a trench 2011 disposed to an upper surface 2012 of the support plate 201, and the optical fiber 203 is arranged along a horizontal direction on the support plate 201 in a bending manner. The optical fiber 203 comprises a plurality of straight line segments 2031 and a plurality of turning segments 2032, each of the turning segments 2032 is located between adjacent two of the straight line segments 2031, and the plurality of straight line segments 2031 are parallel to one another, and thus the optical fiber 203 is formed as a serpentine shape as shown in FIG. 3. In the present preferred embodiment, the optical fiber 203 is disposed in the trench 2011 in a bending manner, and an appearance of the trench 2011 is formed as the serpentine shape due to corresponding to the bended optical fiber 203. It should be noted that the optical fiber 203 in FIG. 4 is illustrated in a linear type for easier illustrations. However, an actual layout of the optical fiber 203 is as illustrated in FIG. 3.

The first circuit board 206 is disposed to a first side 2013 of the support plate 201, which is capable of disposing the light emitting element 202 thereon for providing electric power to the light emitting element 202. Furthermore, the light emitting element 202 is capable of generating a light beam B and then the light beam B enters into the optical fiber 203 from a first end 2033 of the optical fiber. The second circuit board 207 is disposed to a second side 2014 of the support plate 201, which is capable of disposing the optical sensing element 204 thereon for providing electric power to the optical sensing element 204. As a result, the optical sensing element 204 is disposed adjacent to a second end 2034 of the optical fiber 203 and thus capable of receiving the light beam B transmitted through the optical fiber 203. The control unit 205 is disposed on the second circuit board 207 as well and connects with the optical sensing element 204. Of course, the electric power for driving the control unit 205 is provided by the second circuit board 207 as well. In the present preferred embodiment, the first side 2013 is the left side of the support plate 201, and the second side 2013 is the right side of the support plate 201. In addition, the light emitting element 202 is a Light Emitting Diode (LED), the optical sensing element 204 is a Charge-Coupled Device (CCD) or a Complementary Metal-Oxide Semiconductor (CMOS), and the control unit 205 is a microprocessor.

In the FIG. 4, the optical fiber 203 further comprises an optical fiber core 2035 and an optical fiber cladding 2036. The optical fiber core 2035 is capable of transmitting the light beam B, while the optical fiber cladding 2036 covers the optical fiber core 2035 and capable of enabling the light beam B to be totally reflected in the optical fiber core 2035, wherein the light beam B enters into the optical fiber core 2035 of the optical fiber 203 from the first end 2033 thereof, and the light beam B travels towards the second end 2034 of the optical fiber 203. An entering region 2033A and two reflection regions 2033B are disposed on the first end 2033 of the optical fiber 203, wherein the entering region 2033A is located between the two reflection regions 2033B and capable of enabling the light beam B transmitted from the light emitting element 202 to enter into the optical fiber core 2035.

Figure 5:
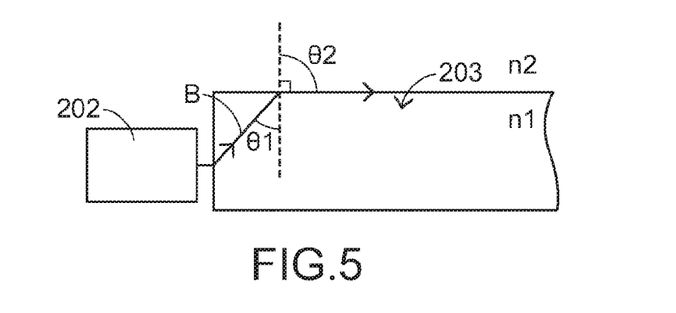
FIG. 5 illustrates a partially structural side view of the optical fiber of the optical touch panel according to the first preferred embodiment of the present invention, wherein there is no refraction occurred therein.
Figure 6:
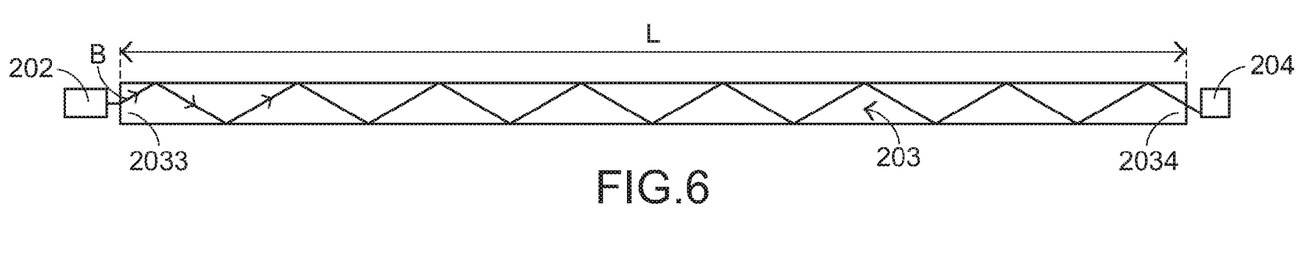
FIG. 6 illustrates a structural side view of the optical fiber of the optical touch panel according to the first preferred embodiment of the present invention, wherein there is total reflection occurred therein.

The principle of how the light beam B is totally reflected in the optical fiber 203 is illustrated hereinafter, wherein the light beam B is totally reflected means that the light beam B is never refracted. FIG. 5 illustrates a partially structural side view of the optical fiber of the optical touch panel according to the first preferred embodiment of the present invention, wherein there is no refraction occurred therein, and FIG. 6 illustrates a structural side view of the optical fiber of the optical touch panel according to the first preferred embodiment of the present invention, wherein there is total reflection occurred therein. Referring to FIG. 5 first, in the present preferred embodiment, the optical fiber 203 is made of glass, and an index of refraction n1 of the glass is about 1.5, wherein the optical fiber 203 is operated in air, and an index of refraction n2 of the air is 1. When the light beam B travels in the optical fiber 203, an angle of refraction θ2 of the light beam B (i.e. critical angle) is 90 degrees, which represents a critical state between the light being refracted and totally reflected. According to the Snell's Law:

$$n1 \times \sin\theta1 = n2 \times \sin\theta2,$$

an incident angle θ1 of the light beam B is calculated as 41.8 degrees. Therefore, when the incident angle θ1 of the light beam B is ranged between 41.8 degrees and 90 degrees, the light beam B is totally reflected. According to the above mentioned situation of total reflection of light, the light beam B is generated at an emitting time t0 by the light emitting element 202 and then enters into the optical fiber 203 from the first end 2033 of the optical fiber 203. Next, the light beam B is transmitted through the optical fiber 203, outputted from the second end 2034 of the optical fiber 203, and then received by the optical sensing element 204 as illustrated in FIG. 6. After that, the optical sensing element 204 outputs a first signal S1 corresponding to the light beam B to the control unit 205 in response to the light beam B, and thus the control unit 205 receives the first signal S1 at a first time t1, wherein the first signal S1 is an electrical signal in a form of electrical energy converted from the light beams B in a form of light energy.

Figure 7:
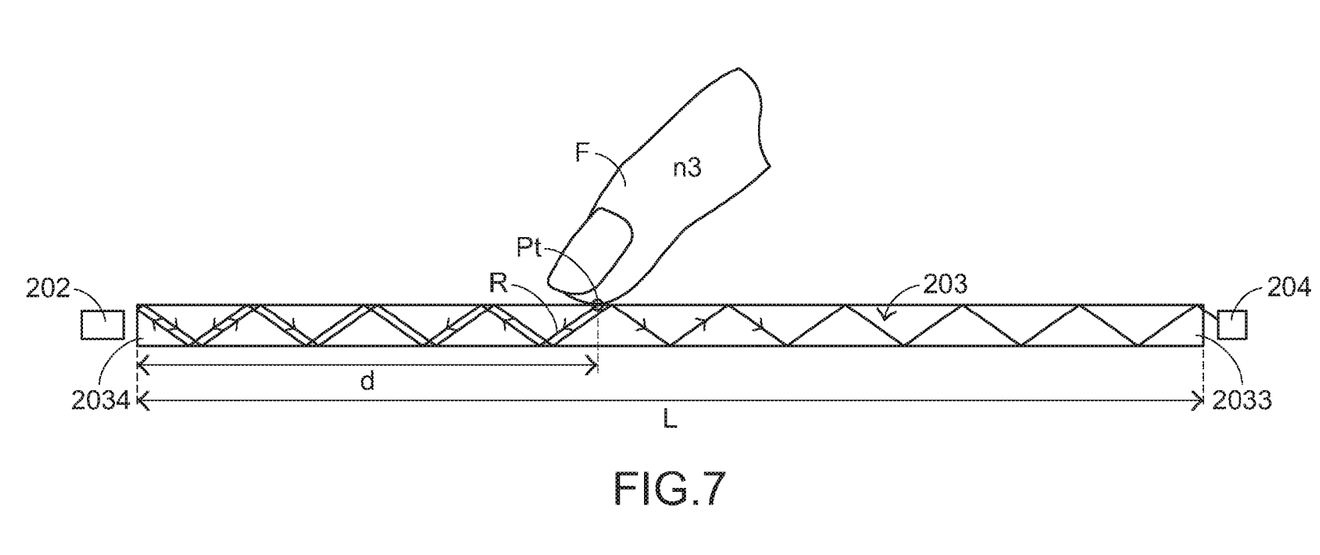
FIG. 7 illustrates a structural side view of the optical fiber of the optical touch panel according to the first preferred embodiment of the present invention, wherein the optical fiber is touched and thus generates an optical return.

FIG. 7 illustrates a structural side view of the optical fiber of the optical touch panel according to the first preferred embodiment of the present invention, wherein the optical fiber is touched and thus generates an optical return. Referring to FIG. 7, when the light beam B travels in the optical fiber 203 and an object F touches the optical fiber 203, the index of refraction of a medium is varied due to an index of refraction n3 of the medium of the object F (is about 1.4) is different from the index of refraction n2 of the medium of the air. Therefore, a part of the light beam B keeps on traveling towards the second end 2034 of the optical fiber 203, and the part of the light beam B are received by the optical sensing element 204 later than the first time t1 due to an effect of the object F, wherein the time that the part of the light beam B being received is very close to the first time t1, and thus a delay time thereof can be neglected, i.e. taking the first time t1 as the time that the part of the light beam B being received. In contrast, an optical return R is generated from the other part of the light beam B in response to the touch of the object F, wherein the optical return R travels from a contact location Pt where the optical fiber 203 is touched by the object F towards the first end 2033 of the optical fiber 203. In addition, when the optical return R is projected to the two reflection regions 2033B on the first end 2033, the optical return R is reflected by the reflection regions 2033B and thus travels towards the second end 2034 of the optical fiber 203, and the optical return R is outputted from the second end 2034 of the optical fiber 203 as well and thus received by the optical sensing element 204. After that, the optical sensing element 204 outputs a second signal S2 corresponding to the optical return R to the control unit 205 in response to the optical return R, and thus the control unit 205 receives the second signal S2 at a second time t2, wherein the second signal S2 is an electrical signal in a form of electrical energy converted from the optical return R in a form of light energy. In the present preferred embodiment, the object F is a finger of a user.

Hence, the control unit 205 is capable of obtaining a trigger distance d according to the first time t1 that the first signal S1 is received, the second time t2 that the second signal S2 is received and a conduction velocity Vf of the light beam B transmitted by the optical fiber 203, and then obtaining the contact location Pt according to the trigger distance d and a total length L of the optical fiber 203, wherein $$d=(Vf\times(t2-t1))/2, \text{ and } Vf=\text{light speed } C \div n1$$

In the present preferred embodiment, the total length L of the optical fiber 203 is 100 cm, and the conduction velocity Vf is calculated as that the light speed C ($3\times10^8$ m/s) divided by the index of refraction n1 of the glass (i.e. 1.5) equals to $1.52\times10^8$ m/s. In addition, the emitting time is equal to 0 s, the first time t1 is equal to 5 nanoseconds, and the second time t2 is equal to 10 nanoseconds. Hence, the trigger distance d is calculated as 50 cm, and thus the contact location Pt is located at a center of the optical fiber 203 due to the total length L of the optical fiber 203.

Figure 8:
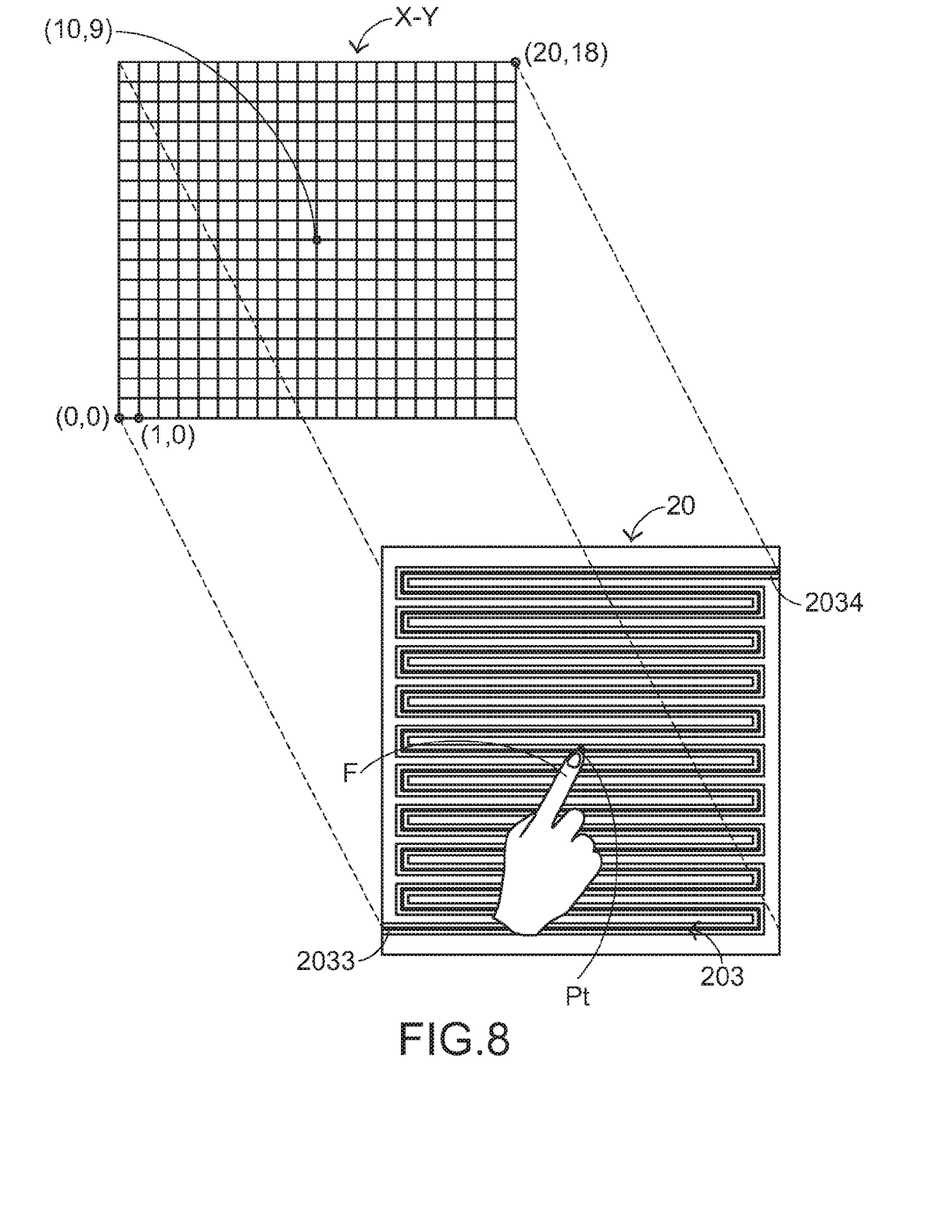
FIG. 8 illustrates a top view of the optical touch panel corresponding to a coordinate plane according to the first preferred embodiment of the present invention.

FIG. 8, which illustrates a top view of the optical touch panel corresponding to a coordinate plane according to the first preferred embodiment of the present invention, is referred hereinafter. A coordinate plane X-Y corresponding to the optical touch panel 20 is represented in FIG. 8, wherein each support plate coordinate corresponds to a position of the optical fiber 203 on the support plate 201. For example, referring to FIG. 3 and FIG. 8 together, the first end 2033 of the optical fiber 203 in FIG. 3 (i.e. a contact location where is predefined as a distance equal to 0 mm) corresponds to a support plate coordinate (0, 0) in FIG. 8, and a location (i.e. a contact location where is predefined as a distance equal to 3 mm) at a right side of the support plate coordinate (0, 0) and distanced therefrom with one coordinate scale is a support plate coordinate (1, 0), and so on, and otherwise a coordinate corresponding to the contact location Pt is a support plate coordinate (10, 9), wherein each one of the coordinate scales between each adjacent two of the support plate coordinates is about 3 mm The above mentioned plurality of support plate coordinates are stored in a location database 2051 in the control unit 205 in advance (referring to FIG. 3). When the control unit 205 computes to obtain the trigger distance d (i.e. 50 cm), the control unit 205 searches the support plate coordinate (10, 9) corresponding to the trigger distance d from the location database 2051 and thus obtains the contact location Pt. After that, the control unit 205 is capable of outputting a trigger signal corresponding to the contact location Pt (or corresponding to the object F), and then a command corresponding thereto is executed accordingly.

A process that the plurality of contact location of the optical fiber 203 is triggered is particularly illustrated hereinafter. When the object F (i.e. a finger of a user) touches the optical touch panel 20 and the plurality of the contact locations of the optical fiber 203 of the optical touch panel 20 are touched, the control unit 205 obtains the plurality of trigger distances corresponding to the plurality of contact locations according to the above mentioned computing process, and then searches the plurality of support plate coordinates corresponding to the plurality of trigger distances from the location database 2051. After that, the control unit 205 averages the plurality of support plate coordinates, so as to obtain a center contact location of the plurality of contact locations and output the trigger signal corresponding to the center contact location.

Figure 9:
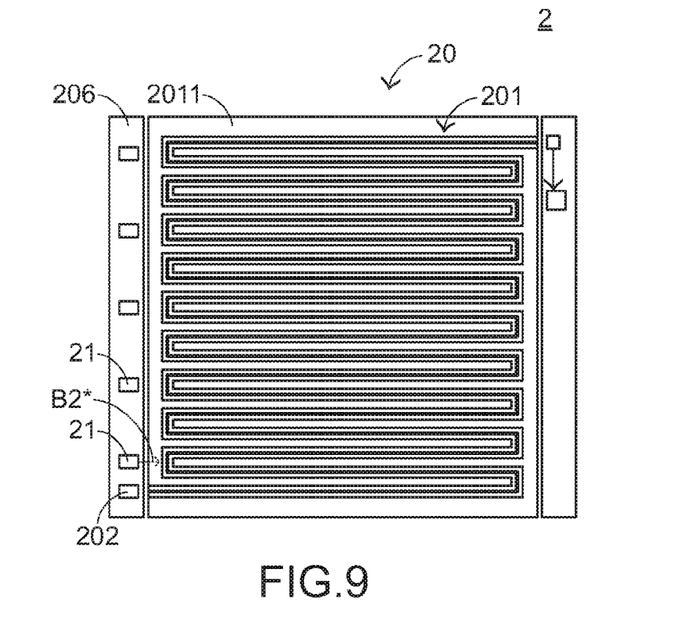
FIG. 9 illustrates a structural side view of an optical touch device according to a second preferred embodiment of the present invention.
Figure 10:
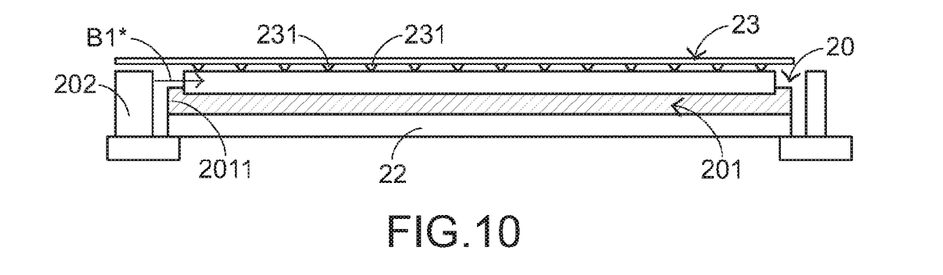
FIG. 10 illustrates a structural top view of the optical touch device according to the second preferred embodiment of the present invention.

In addition, the present invention further provides a second preferred embodiment. FIG. 9 illustrates a structural side view of an optical touch device according to a second preferred embodiment of the present invention, and FIG. 10 illustrates a structural top view of the optical touch device according to the second preferred embodiment of the present invention. Referring to FIG. 9 and FIG. 10 together, the optical touch device 2 comprises the optical touch panel 20 as illustrated in the first preferred embodiment, another light emitting element 21, a light guide plate 22 and a protective layer 23, wherein the structure, the operation principle and the activating condition of the optical touch panel 20 are the same as the descriptions illustrated above and thus omitted herein. However, it should be noted that the light emitting element 202 of the optical touch panel 20 is used for generating a first light beam B1*.

Moreover, the another light emitting element 21 is disposed to the first side 2013 of the support plate 201, adjacent to the light emitting element 202 and capable of generating a second light beam B2*. Further, the light guide plate 22 is disposed under the support plate 201 of the optical touch panel 20 and capable of guiding the second light guide beam B2* to let the optical touch device 2 emit light. In addition, the protective layer 23 is disposed over the optical touch panel 20 and capable of protecting the optical touch panel 20 from directly contacting with other objects. Herein, the protective layer 23 comprises a plurality of spacing elements 231 disposed to a bottom of the protective layer 23. The spacing elements 231 are disposed on the support plate 201 of the optical touch panel 20 where is no optical fiber 203 thereon. Therefore, the spacing elements 231 are capable of separating the protective layer 23 from the optical touch panel 20 for preventing the optical touch panel 20 from being triggered.

When the object touches the protective layer 23, a deformation of the protective layer 23 is generated due to the touch, and thus the protective layer 23 protrudes between the spacing elements 231 to trigger the optical touch panel 20 under the protective layer 23, so as to generate the corresponding trigger signal. In the present preferred embodiment, the spacing elements 231 are formed by using an ultraviolet curing printing ink (i.e. UV inks) to print on the bottom of the protective layer 23.

Similar to the first preferred embodiment, the light emitting element 202 is disposed on the first circuit board 206. Besides, the another light emitting element 21 is disposed on the first circuit board 206 as well, and the first circuit board 206 provides electric power to the another light emitting element 21, too. In the present preferred embodiment, the another light emitting element 21 is a LED. In a word, the another light emitting element and the light guide plate 22 are capable of providing the optical touch device 2 for emitting light.

Figure 11:
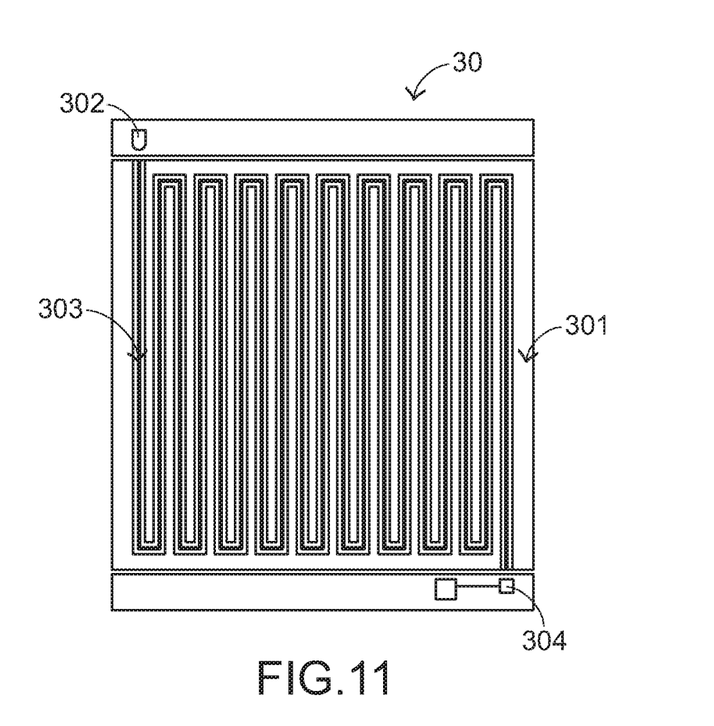
FIG. 11 illustrates a structural top view of an optical touch panel according to a third preferred embodiment of the present invention.

In the first preferred embodiment and the second preferred embodiment, the light emitting element 202 is disposed at the left side of the support plate 201, and the optical sensing element 204 is disposed at the right side of the support plate 201, while the optical fiber 203 is arranged on the support plate 201 in a horizontal bending manner. However, the preset invention is not limited to the above mentioned descriptions. FIG. 11 illustrates a structural top view of an optical touch panel according to a third preferred embodiment of the present invention. As an example of the optical touch panel 30 illustrated in the third preferred embodiment of the present invention, the light emitting element 302 of the optical touch panel 30 is capable of being disposed at an upper side of a support plate 301, and the optical sensing element 304 is capable of being disposed at a lower side of the support plate 301, while the optical fiber 303 is capable of being arranged on the support plate 301 in a vertical bending manner as illustrated in FIG. 11.

According to the above mentioned embodiments, it should be understood that the optical touch panel and the optical touch device of the present invention determine the location being triggered by using the light beam and the optical return in the optical fiber, so as to output the trigger signal correspondingly. In addition, the optical touch panel is capable of being activated by disposing one light emitting element adjacent to the first end of the optical fiber and disposing one optical sensing element adjacent to the second end of the optical fiber in the optical touch panel only. Compared with the conventional art, the conventional optical touch panel must be applied by disposing a plurality of light emitting elements and a plurality of optical sensing elements corresponding to the plurality of light emitting elements therein, but the optical touch panel of the present invention is required to dispose one light emitting element and one optical sensing element only. Obviously, the optical touch panel and the optical touch device of the present invention are capable of not only saving a significant amount of cost, but also reducing the required space for disposing the plurality of light emitting elements and the plurality of optical sensing elements. In a word, the optical touch panel and the optical touch device of the present invention not only have an advantage of manufacturing cost, but also the volume thereof can be reduced for lighter and thinner.

What is claimed is:

1. An optical touch panel, comprising:
   a support plate;
   a light emitting element, capable of generating a light beam;

an optical fiber, arranged on the support plate in a bending manner, wherein a first end of the optical fiber is capable of receiving the light beam, and thus the light beam is transmitted through the optical fiber and then outputted from a second end of the optical fiber, when the optical fiber is touched by an object, an optical return is generated within the optical fiber;

an optical sensing element, disposed adjacent to the second end of the optical fiber, capable of receiving the light beam transmitted through the optical fiber and then outputting a first signal corresponding to the light beam, and capable of receiving the optical return and then outputting a second signal corresponding to the optical return; and a control unit, connecting with the optical sensing element, and capable of determining a contact location where the optical fiber is touched by the object according to the first signal and the second signal and then outputting a trigger signal corresponding to the object, wherein the optical return travels from the contact location where the optical fiber is touched by the object to the first end of the optical fiber, and the optical return is reflected by the first end of the optical fiber, travels from the first end of the optical fiber to the second end of the optical fiber, and is received by the optical sensing element in sequence.

2. The optical touch panel as claimed in claim 1, wherein the optical fiber comprises a plurality of straight line segments and a plurality of turning segments, each of the turning segments is located between adjacent two of the straight line segments, and the plurality of straight line segments are parallel to one another.

3. The optical touch panel as claimed in claim 1, wherein the support plate has a trench disposed to an upper surface of the support plate and capable of disposing the optical fiber therein, and an appearance of the trench is formed as a serpentine shape corresponding to the optical fiber being bended.

4. The optical touch panel as claimed in claim 1, further comprising:
a first circuit board, capable of disposing the light emitting element thereon and providing electric power to the light emitting element; and
a second circuit board, capable of disposing the optical sensing element thereon and providing electric power to the optical sensing element.

5. The optical touch panel as claimed in claim 1, wherein the control unit obtains a trigger distance d according to a first time t1 that the first signal is received, a second time t2 that the second signal is received and a conduction velocity Vf of the light beam transmitted by the optical fiber, and then obtains the contact location according to the trigger distance and a total length of the optical fiber, and $d=(Vf \times (t2-t1))/2$.

6. The optical touch panel as claimed in claim 5, wherein the control unit is preset to have a location database capable of storing a plurality of support plate coordinates, and when the control unit obtains the trigger distance, the control unit searches one of the support plate coordinates corresponding to the trigger distance from the location database, so as to obtain the contact location.

7. The optical touch panel as claimed in claim 6, wherein when a plurality of contact locations of the optical fiber are touched by the object, the control unit obtains a plurality of support plate coordinates corresponding to a plurality of trigger distances according to the plurality of trigger distances corresponding to the plurality of contact locations, and the control unit averages the plurality of support plate coordinates to obtain a center contact location of the plurality of contact locations and outputs the trigger signal corresponding to the center contact location.

8. The optical touch panel as claimed in claim 1, wherein the optical fiber comprises:
an optical fiber core, capable of transmitting the light beam and the optical return; and
an optical fiber cladding, covering the optical fiber core and capable of enabling the light beam and the optical return to be totally reflected in the optical fiber core.

9. An optical touch device, comprising:
an optical touch panel, comprising:
a support plate;
a light emitting element, capable of generating a first light beam;
an optical fiber, arranged on the support plate in a bending manner, wherein a first end of the optical fiber is capable of receiving the first light beam, and thus the first light beam is transmitted through the optical fiber and then outputted from a second end of the optical fiber, when the optical fiber is touched by an object, an optical return is generated within the optical fiber;
an optical sensing element, disposed adjacent to the second end of the optical fiber, capable of receiving the first light beam transmitted through the optical fiber and then outputting a first signal corresponding to the first light beam, and capable of receiving the optical return and then outputting a second signal corresponding to the optical return; and
a control unit, connecting with the optical sensing element, and capable of determining a contact location where the optical fiber is touched by the object according to the first signal and the second signal and then outputting a trigger signal corresponding to the object, wherein the optical return travels from the contact location where the optical fiber is touched by the object to the first end of the optical fiber, and the optical return is reflected by the first end of the optical fiber, travels from the first end of the optical fiber to the second end of the optical fiber, and is received by the optical sensing element in sequence;
another light emitting element, located at a first side of the light emitting element and capable of generating a second light beam; and
a light guide plate, disposed under the support plate and capable of guiding the second light beam to let the optical touch device be luminous.

10. The optical touch device as claimed in claim 9, wherein the optical fiber comprises a plurality of straight line segments and a plurality of turning segments, each of the turning segments is located between adjacent two of the straight line segments, and the plurality of straight line segments are parallel to one another.

11. The optical touch device as claimed in claim 9, wherein the support plate has a trench disposed to an upper surface of the support plate and capable of disposing the optical fiber therein, and an appearance of the trench is formed as a serpentine shape corresponding to the optical fiber being bended.

12. The optical touch device as claimed in claim 9, further comprising:
a first circuit board, capable of disposing the light emitting element and the another light emitting element thereon and providing electric power to the light emitting element and the another light emitting element; and a second circuit board, capable of disposing the optical sensing element thereon and providing electric power to the optical sensing element.

13. The optical touch device as claimed in claim 9, wherein the control unit obtains a trigger distance d according to a first time t1 that the first signal is received, a second time t2 that the second signal is received and a conduction velocity Vf of the light beam transmitted by the optical fiber, and then obtains the contact location according to the trigger distance and a total length of the optical fiber, and $d=(Vf \times (t2-t1))/2$.

14. The optical touch device as claimed in claim 13, wherein the control unit is preset to have a location database capable of storing a plurality of support plate coordinates, and when the control unit obtains the trigger distance, the control unit searches one of the support plate coordinates corresponding to the trigger distance from the location database, so as to obtain the contact location.

15. The optical touch device as claimed in claim 14, wherein when a plurality of contact locations of the optical fiber are touched by the object, the control unit obtains a plurality of support plate coordinates corresponding to a plurality of trigger distances according to the plurality of trigger distances corresponding to the plurality of contact locations, and the control unit averages the plurality of support plate coordinates to obtain a center contact location of the plurality of contact locations and outputs the trigger signal corresponding to the center contact location.

16. The optical touch device as claimed in claim 9, wherein the optical fiber comprises:
   an optical fiber core, capable of transmitting the first light beam and the optical return; and
   an optical fiber cladding, covering the optical fiber core and capable of enabling the first light beam and the optical return to be totally reflected in the optical fiber core.

* * * * *